United States Patent [19]

Paas

[11] Patent Number: 5,272,874
[45] Date of Patent: Dec. 28, 1993

[54] EXHAUST TREATMENT SYSTEM

[75] Inventor: Norbert Paas, Loveland, Colo.

[73] Assignee: Dry Systems Technologies, Louisville, Colo.

[21] Appl. No.: 765,689

[22] Filed: Sep. 26, 1991

[51] Int. Cl.$^5$ .............. F01N 3/28; F01N 3/04; F28G 9/00

[52] U.S. Cl. .............. 60/297; 60/302; 60/310; 60/320; 165/95; 422/169; 422/173

[58] Field of Search .............. 60/274, 297, 298, 302, 60/310, 311, 320, 321; 422/169, 173; 55/84, 80, 222, 268, 269, DIG.; 165/95

[56] References Cited

U.S. PATENT DOCUMENTS

| | | | |
|---|---|---|---|
| 2,911,289 | 11/1959 | Forry | 60/310 |
| 3,263,413 | 8/1966 | Van Vactor | 60/310 |
| 3,282,046 | 11/1966 | Walker | 60/297 |
| 3,786,635 | 1/1974 | Kates et al. | |
| 3,886,738 | 6/1975 | Sien | |
| 3,903,694 | 9/1975 | Aine | |
| 4,075,994 | 2/1978 | Mayer et al. | |
| 4,091,616 | 3/1978 | Loweg | 60/302 |
| 4,133,654 | 1/1979 | Hill et al. | |
| 4,190,629 | 2/1980 | Strachan | 60/297 |
| 4,338,784 | 7/1982 | Liu et al. | |
| 4,345,429 | 8/1982 | Yasuhara | |
| 4,671,060 | 6/1987 | Wilkens | |
| 4,864,821 | 9/1989 | Hoch | |
| 4,869,209 | 9/1989 | Young | 165/95 |
| 4,887,427 | 12/1989 | Shinzawa | 60/302 |

*Primary Examiner*—Douglas Hart
*Attorney, Agent, or Firm*—Bruce E. Dahl

[57] ABSTRACT

An improved exhaust treatment apparatus includes a particulate filter assembly connected to the exhaust system of a diesel engine for removing the solid particulate soot matter entrained in the engine exhaust. The particulate filter assembly includes a disposable low-temperature filter element that can be readily replaced when it becomes clogged. Heat insulated catalyst assemblies located upstream of the particulate filter assembly reduce the amounts of solid particulate matter and other gaseous pollutants in the engine exhaust. A self-cleaning exhaust gas heat exchanger located between the catalyst assemblies and the particulate filter cools the hot, catalyzed exhaust gases before they reach the low temperature filter element. The self-cleaning heat exchanger also includes an intermittent water injection system for periodically removing soot accumulations from the heat exchanger.

9 Claims, 5 Drawing Sheets

EXHAUST TREATMENT SYSTEM

BACKGROUND OF THE INVENTION

1. Field of the Invention

This invention relates generally to methods and apparatus for reducing the emissions of diesel engines and more specifically to methods and apparatus for reducing the emissions of diesel engines intended for use in underground mines and other similar or potentially inflammable or inadequately ventilated environments.

2. Background of the Invention

Diesel engines are used to power a wide variety of vehicles and equipment used in various underground and mining applications due to their improved safety and efficiency over electrically powered vehicles and equipment. However, there are substantial problems associated with the use of diesel engines in such underground environments that have not yet been solved.

One problem is that is not unusual for the air in underground mines to contain various ignitable dusts or explosive gases, most likely methane. Unfortunately, a diesel engine is prone to emit sparks or flames caused by backfiring through the intake or exhaust manifolds, which may cause a fire or explosion if the atmosphere surrounding the engine contains certain concentrations of the ignitable dusts or explosive gases. Moreover, since the internal operating temperatures of such engines may exceed 1200° F., the external surfaces of the engines may be heated to extremely high temperatures. Such high surface temperatures can trigger a fire or explosion if ignitable dusts accumulate on the hot external surfaces of the engine or if inflammable liquids come in contact with these hot surfaces.

Another factor which has heretofore limited the use of diesel engines in mines or other environments having limited ventilation, and with increasing environmental awareness, is becoming a concern in all diesel engine operations, is that the exhaust from such engines contains numerous components thought to be harmful to humans, such as unburned hydrocarbons, carbon monoxide (CO), oxides of nitrogen ($NO_x$), sulfur dioxide ($SO_2$), sulfates, as well as solid particulate matter. Generally speaking, the solid particulate matter in the diesel engine exhaust comprises small, solid, irregularly shaped particles, which are themselves agglomerates of smaller sub-particles. The solid particulate matter may often have high molecular weight hydrocarbons absorbed on their surfaces. Frequently, the particulate matter is a complex mixture of pure carbon and various kinds of organic materials, and the sizes may range from very small particles of about 0.01 microns to relatively large clusters in the range of 10–30 microns, giving the particulate an extremely fine and light, flour-like consistency. Turbocharged diesel engines tend to emit more of the smaller particles with much lower levels of retained organic compounds. Particle sizes of 10 microns and less are considered to be the most damaging to human lungs, and certain characteristic components of diesel exhaust particulate emissions are known carcinogens.

Particulate emission can be reduced by limiting the power output of the diesel engine, and manufacturers can reduce particulate emissions by limiting the amount of fuel injected under acceleration and high load (i.e., lug-down) conditions. However, reducing the amount of fuel injected during acceleration and lug-down operations is not effective to eliminate all solid particulate emission, or even decrease it to a desirably low level, unless the power output of the engine is reduced to an unacceptably low level.

Consequently, several alternative systems have been developed in recent years in attempts to find a more effective means of reducing the solid particulate emissions of diesel engines in hopes of making the engine exhaust cleaner, thereby enhancing the diesel engines' environmental acceptability, and making them more suitable for underground use. Principle among these alternative systems are water scrubbing systems, systems that thermally (i.e., catalytically) oxidize the particulate matter while it is still entrained in the exhaust stream, systems for thermally oxidizing filter-trapped particulate matter, and systems for catalytically oxidizing filter trapped particulate matter. Some examples of such alternative systems are disclosed in U.S. Pat. No. 3,786,635 issued to Kates et al., U.S. Pat. No. 3,886,738 issued to Sien, U.S. Pat. No. 3,903,694 issued to Aine, U.S. Pat. No. 4,075,994 issued to Mayer et al., U.S. Pat. No. 4,133,654 issued to Hill et al., U.S. Pat. No. 4,338,784 issued to Liu et al., U.S. Pat. No. 4,345,429 issued to Yasuhara, U.S. Pat. No. 4,671,060 issued to Wilkens, and U.S. Pat. No. 4,864,821 issued to Hoch.

Unfortunately, none of these systems has proven to be a panacea, and there remain a number of serious shortcomings which have tended to limit their success, particularly in the underground mining environment. For example, most water scrubbing systems, such as those disclosed by Sien and Hill et al., typically comprise a water-filled baffle chamber that is connected to the exhaust manifold of the engine. The exhaust gases from the engine are bubbled through the water in the chamber, which cools the exhaust gases and remove a small percentage (about 10%) of the solid particulate matter. Since the exhaust gases pass through a water bath most water scrubbing systems make excellent flame arresters, which, of course, has made them attractive for use in inflammable atmospheres, such as those typically associated with underground mines. Unfortunately, however, water scrubbers consume relatively large amounts of water and must be thoroughly cleaned at very frequent intervals. While water scrubbers do initially remove some of the water-soluble sulfur dioxide ($SO_2$) from the exhaust gases, they cannot remove carbon monoxide, oxides of nitrogen, or other gaseous pollutants from the exhaust gases. However, even the removal of the sulfur dioxide creates problems because the absorbed sulfur dioxide reacts with the water to form sulfuric acid ($H_2SO_4$). This sulfuric acid is eventually emitted from the exhaust system along with the exhaust gases, which causes irritation of the upper airways of miners working in the vicinity of the engine. Furthermore, recent changes in the laws regulating the emissions of mine certified diesel engines have tightened the emission requirements to the point were most water scrubbers just cannot meet the new, more rigorous emission requirements.

The patent issued to Wilkens uses a "dry" heat exchanger to cool the exhaust gases to avoid some of the problems associated with the water scrubbers. Unfortunately, Wilkens' heat exchanger accumulates soot deposits quite rapidly, which significantly reduces the thermal transfer efficiency of the heat exchanger. Consequently, Wilkens' heat exchanger must be disassembled and thoroughly cleaned at frequent intervals; an expensive and time-consuming process. Moreover, Wilkens' system cannot meet the new exhaust emission requirements, because it does not remove any of the solid particulate matter or gaseous pollutants from the engine exhaust.

One method for reducing the amount of particulate matter in diesel engine exhaust is instream thermal oxidation. Disadvantageously, instream thermal oxidation techniques require the provision to the exhaust stream of large amounts of heat energy to further oxidize the particulate matter, which heat is usually unrecoverable, thus reducing efficiency of the system. Catalytic instream oxidation methods, such as those disclosed by Mayer et al. and Yasuhara do not require additional energy, but they also do not solve the problem of devising a suitable means for introducing the catalyst material into the exhaust stream without raising the surface temperature of the exhaust manifold or the temperature of the exhaust gases themselves above the maximum allowable safe temperatures.

Another method of reducing the solid particulate emissions is to use a filter to trap the particulate matter before it escapes into the surrounding atmosphere. Ceramic materials, stainless steel wire mesh, and other filter materials capable of withstanding the high-temperature exhaust gases have been tried and are being used. The patents issued to Hoch and Yasuhara disclose variations on this theme. Unfortunately, because of the large quantities of particulate matter that are generated by most diesel engines, such filters clog quickly, which increases back pressure in the engine exhaust and affects the performance and efficiency of the engine. Of course, replacing the filter when the back pressure exceeds some predetermined limit would be helpful. However, the metal or ceramic materials used in most effective filters are expensive, so it is simply not practical to throw such filters away when they are clogged. Several filter regeneration methods have been developed in attempts to make such filter systems reusable, the most common being thermal and catalytic oxidation of filter-trapped particulates. Unfortunately, the space, cost, and energy consumption required by such regeneration methods are substantial. Furthermore, in-situ filter regeneration techniques, where the filters rely on the hot exhaust gases themselves to raise the temperature of the filter high enough to oxidize the trapped particles, do not work with the light duty-cycles typically associated with underground engines. Consequently, the high temperature filters used on such light duty cycle engines must be removed and regenerated at some off-site location.

Some systems have been developed in which the relatively expensive high temperature filters are replaced with cheaper, preferably disposable, low temperature filters. Water scrubbers are used to cool the exhaust gases before they pass through the low temperature filters. However, the moist exhaust gases exiting the water scrubbers tend to foul and clog the low temperature filters quite rapidly, and, as mentioned above, water scrubbers have their own problems and maintenance costs.

Finally, Liu et al. teach an electrostatic particle collector to remove the particulate matter from the exhaust gases. However, the high voltages required by this kind of system introduce yet another explosion hazard when used in underground environments or other environments having inflammable atmospheres.

Consequently, there still remains a substantial need for an improved diesel engine emission reduction system that is suitable for use in underground mines or in other environments that have explosive or poorly ventilated atmospheres, or in environments where it is essential that the quantities of solid particulates in the diesel exhaust be kept to a minimum. Such a system must meet the rigorous requirements for spark and flame suppression and for maximum surface and exhaust temperature, while at the same time providing an economical and low maintenance method of removing the solid particulate matter, and preferably some of the carbon monoxide and other pollutants, from the exhaust gases. Ideally, such a system would include a dry heat exchanger to allow the use of inexpensive, disposable low temperature filters and to eliminate the water supply requirements of a water scrubber, but without the need to frequently disassemble and clean the soot accumulations from the heat exchanger. Until the present invention, no such system existed.

SUMMARY OF THE INVENTION

Accordingly, it is a general object of this invention to provide an improved exhaust treatment system for internal combustion engines to efficiently remove solid particulate matter from the exhaust gases while achieving some reduction in other pollutants, such as carbon monoxide and other gaseous pollutants.

It is another general object of this invention to provide an improved exhaust treatment system that is suitable for use with engines in underground mines or other environments having poorly ventilated or inflammable atmospheres.

It is yet another object of this invention to provide an improved exhaust treatment system having a self-cleaning exhaust gas heat exchanger.

It is a further object of this invention to provide an improved exhaust treatment system having a heat insulated, pollution reducing catalyst.

Additional objects, advantages, and novel features of this invention shall be set forth in part in the description that follows, and in part will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the improved exhaust treatment apparatus according to this invention may comprise a particulate filter assembly connected to the exhaust system of the engine for removing the solid particulate matter entrained in the engine exhaust. The particulate filter assembly includes a disposable low-temperature filter element that can be readily replaced when it becomes clogged. A number of heat insulated catalyst assemblies located upstream of the particulate filter assembly reduce some of the solid particulate matter and other gaseous pollutants in the engine exhaust. A self-cleaning exhaust gas heat exchanger located between the catalyst assemblies and the particulate filter cools the hot, catalyzed exhaust gases before they reach the filter assembly. The self-cleaning heat exchanger also includes an intermittent water injection system for periodically removing any soot accumulations from the heat exchanger to maintain thermal efficiency.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
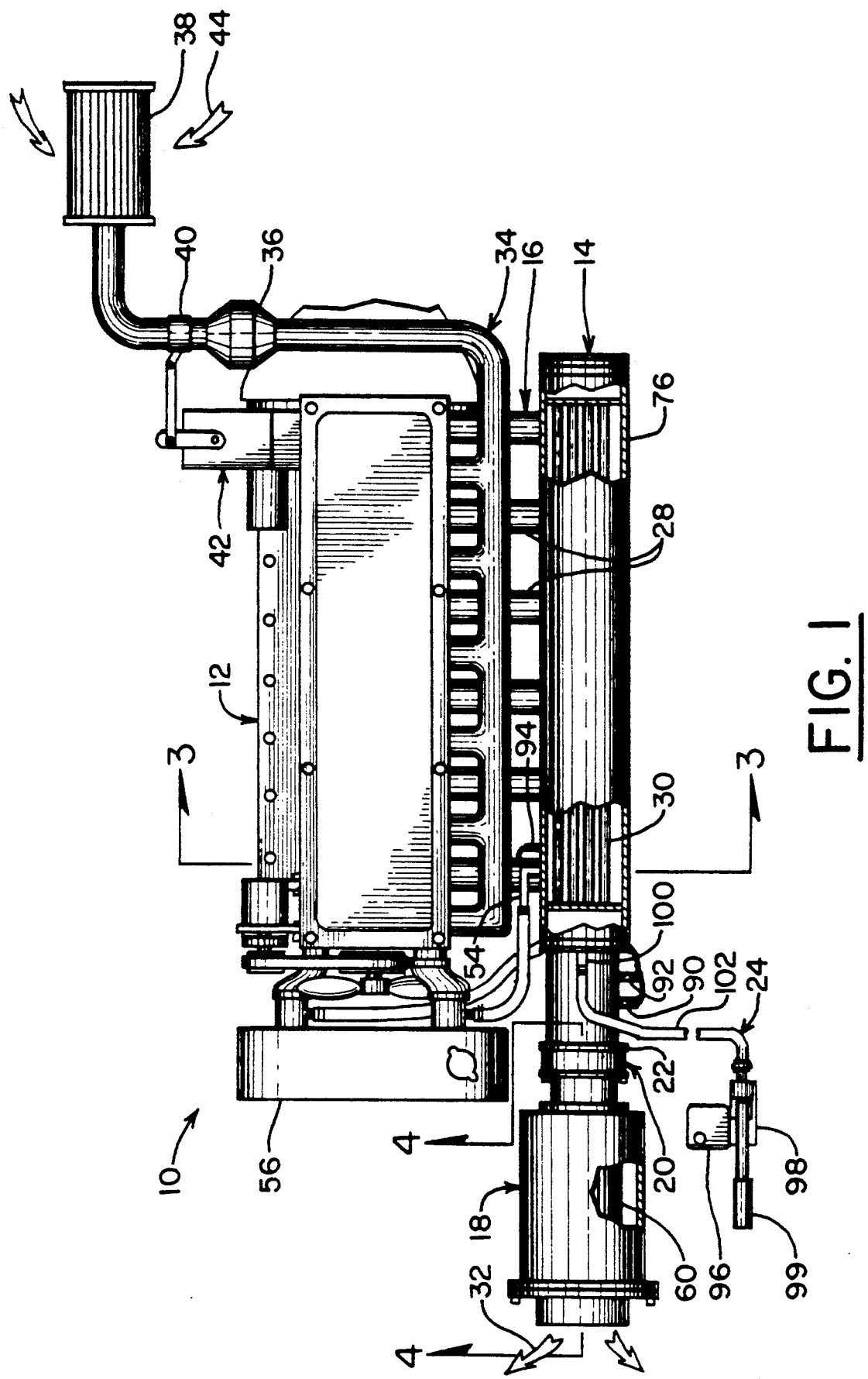
FIG. 1 is a plan view of the improved exhaust treatment system according to the present invention for use on a mine certified diesel engine showing the water cooled heat exchanger and filter assembly.
Figure 3:
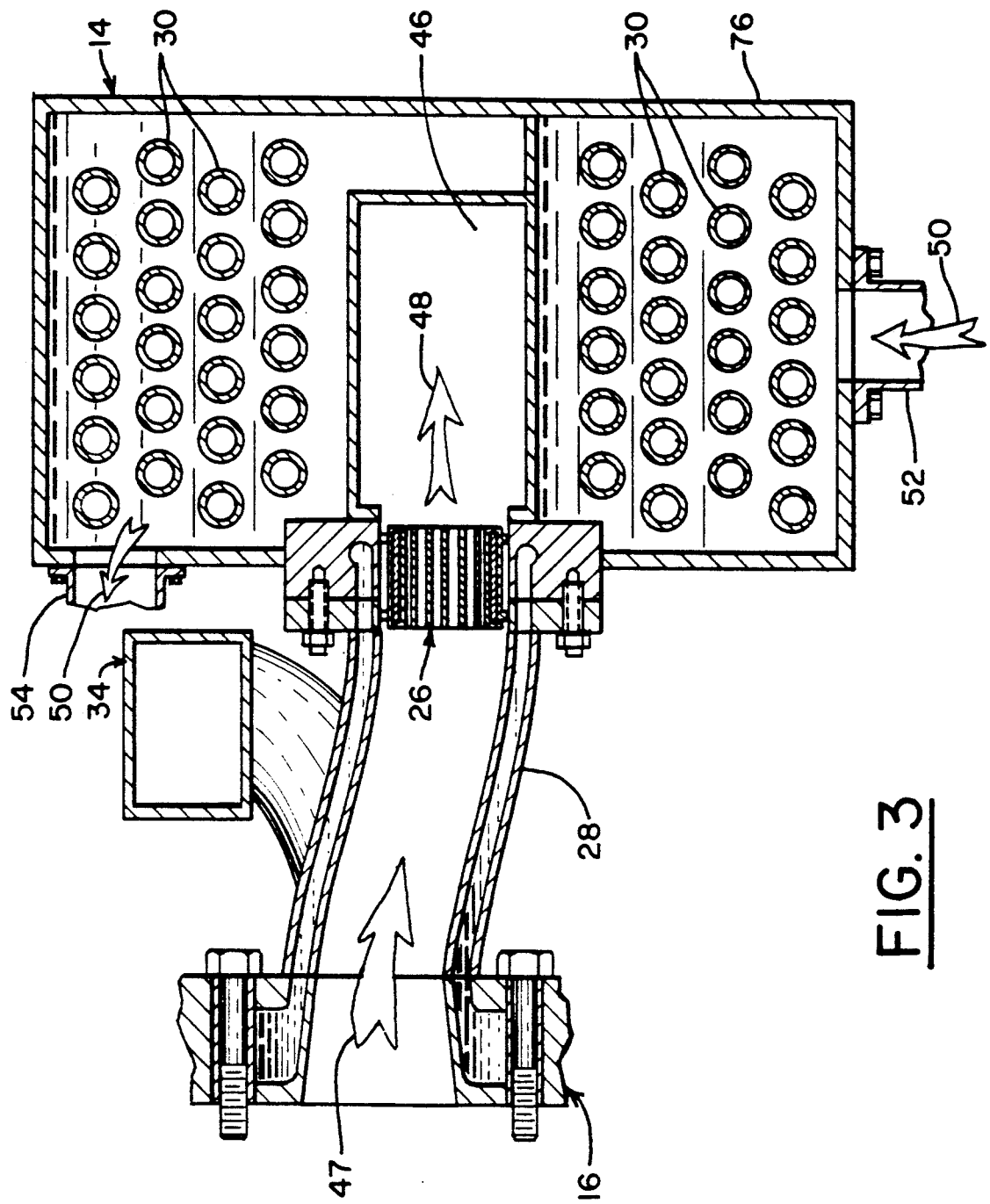
FIG. 3 is a sectional view in elevation of the water cooled heat exchanger and exhaust manifold assembly taken along the line 3—3 in FIG. 1, showing the arrangement of a heat insulated catalyst assembly, the exhaust collection chamber, the cooling tubes, and the flow of cooling water through the heat exchanger.

The improved exhaust treatment system 10 according to the present invention is shown in FIG. 1 installed on a "mine certified" diesel engine 12, i.e., an engine configured for use in underground mines. Briefly, the exhaust treatment system 10 includes various components for removing solid particulate soot emissions from the engine as well as for reducing the levels of carbon monoxide and other gaseous pollutants contained in the engine exhaust. More specifically, the exhaust treatment system 10 includes a filter assembly 18, which contains a disposable low-temperature filter element 60 for filtering out the solid particulate soot matter entrained in the engine exhaust and a self-cleaning exhaust gas heat exchanger 14 for cooling the exhaust gases before they reach the filter assembly 18. The treatment system also includes a plurality of heat insulated catalyst assemblies 26 located where exhaust runners 28 of manifold 16 connect to heat exchanger 14, as best seen in FIG. 3. The catalyst assemblies 26 burn a portion of the particulate soot matter in the engine exhaust before it reaches heat exchanger 14 and filter assembly 18. The catalyst assemblies 26 also reduce the amounts of carbon monoxide, aerosols, and other pollutants in the exhaust gases. The self-cleaning exhaust gas heat exchanger 14 includes an intermittent water injection system 24 for periodically removing soot accumulations from the interior surfaces of the heat exchanger that are exposed to the engine exhaust gases to maintain good thermal transfer efficiency.

During engine operation, intake air 44 is drawn into the engine 12 through an intake air filter 38 and a spark arrester assembly 36. The intake air 44 is compressed mixed with fuel, and the fuel-air mixture burned in the engine combustion chambers (not shown) in a conventional manner. Immediately after leaving the combustion chamber, the raw exhaust gases 47 (FIG. 3) pass through the catalyst assemblies 26 in exhaust manifold 16, which oxidize some of the unburned hydrocarbons, thereby eliminating some of the solid particulate matter in the exhaust gases that would otherwise have to be filtered out by filter assembly 18. The catalyst assemblies 26 also oxidize the carbon monoxide to carbon dioxide. Still referring to FIG. 3, the catalyzed exhaust gases 48 next pass through a plurality of water cooled tubes 30 in heat exchanger 14, which cools the hot exhaust gases from temperatures in the 1200° F. range down to a temperature below 300° F. The cooled exhaust gases 58 then exit the heat exchanger 14 and enter the filter assembly 18 (FIG. 1), which removes substantially all of the remaining solid particulate soot matter from the exhaust gases. The cooled, filtered exhaust gases 32 are then discharged into the atmosphere.

Advantageously, the improved exhaust treatment system 10 does not rely on expensive high temperature filters, such as ceramic filters, to remove the solid particulate matter from the engine exhaust. Pre-cooling the exhaust gases by passing them through heat exchanger 14 allows an inexpensive, low temperature filter element 60 to be used instead. Such filter elements 60 are readily available and are so inexpensive that they can be considered disposable. Thus, when the filter element 60 becomes clogged to the point where it causes unacceptably high back pressure in the exhaust system, it can be removed and discarded, and another filter element installed in its place. Such a disposable filter element 60 therefore eliminates the need for costly high temperature ceramic filters and, more importantly, eliminates the expensive and time consuming filter regeneration processes required for high temperature filters.

Figure 2:
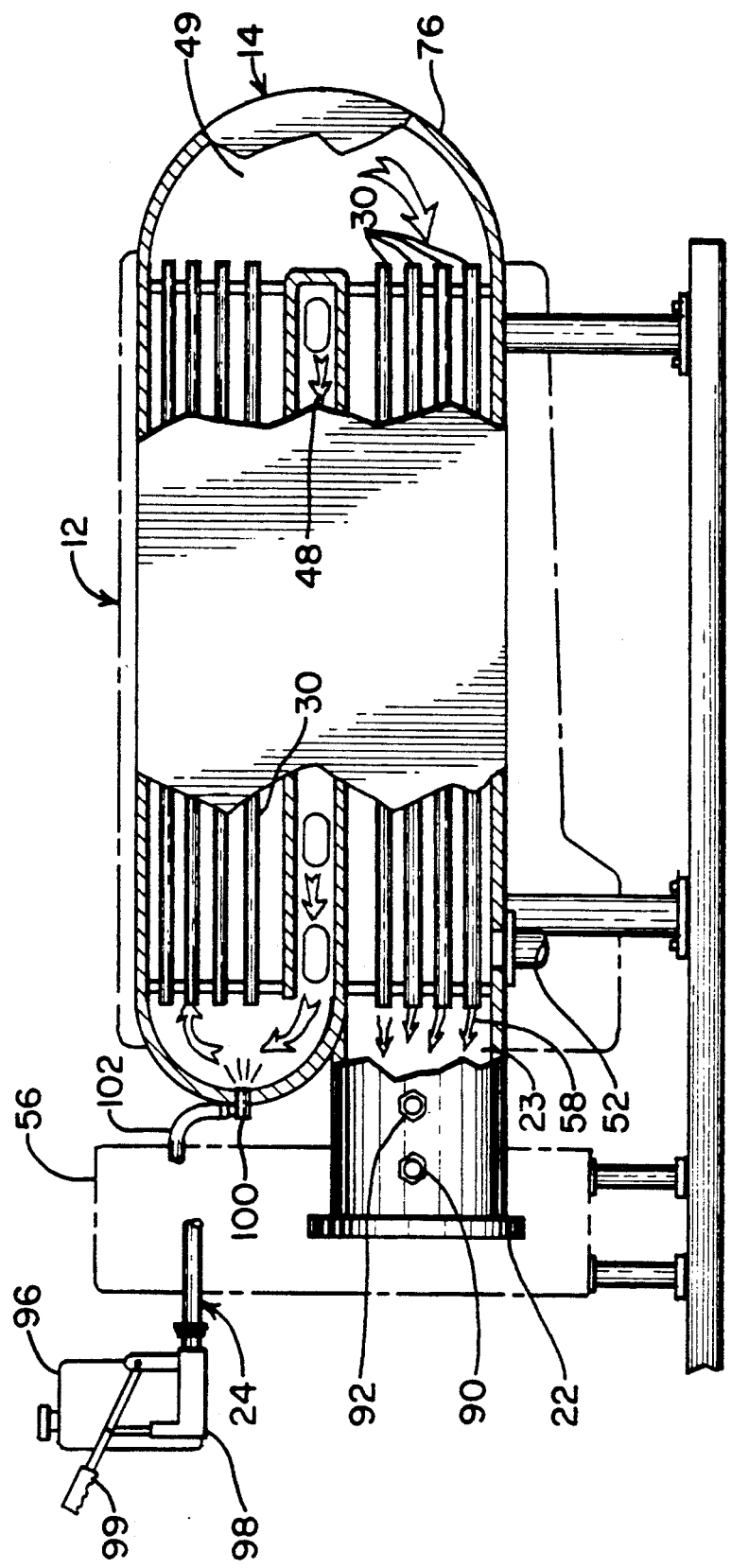
FIG. 2 is a side view in elevation of the water cooled heat exchanger with the filter assembly removed for clarity and with portions of the external housing of the heat exchanger broken away to show the details of the exhaust collection chamber, the cooling tubes, the flame-proof water injection nozzle, and the flow of the exhaust gases through the heat exchanger.

Another significant feature of the improved exhaust treatment system 10 according to this invention is the intermittent water injection system 24, as best seen in FIGS. 1 and 2. Briefly, the water injection system 24 periodically injects a fine spray of water into the exhaust manifold upstream of the heat exchanger 14. The injected water instantly flashes to steam, creating a powerful pressure pulse that travels down the cooling tubes 30 of the heat exchanger, blowing out any accumulated soot deposits. These soot deposits are then captured by the disposable low temperature filter element 60 in filter assembly 18, which element 60 is then usually discarded and a new filter element installed. Until this invention, it was not practical to use such "dry" heat exchangers for cooling diesel engine exhaust, because soot deposits tended to accumulate rapidly on the surfaces the cooling tubes, significantly reducing the thermal efficiency of the heat exchanger. Consequently, if the heat exchanger was to be of any use at all, it had to be disassembled at frequent intervals and the accumulated soot deposits physically scrubbed off the cooling tubes.

Figure 5:
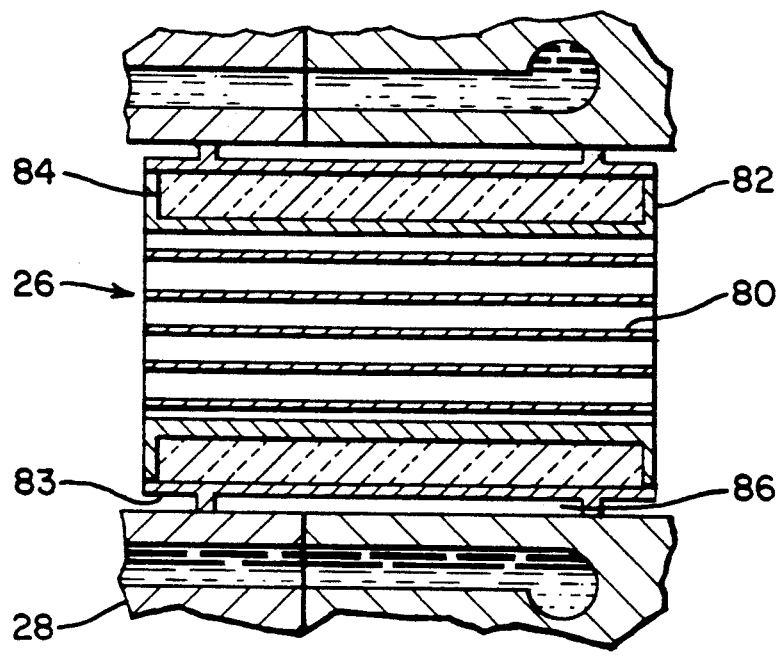
FIG. 5 is an enlarged sectional view of the heat insulated catalyst assembly shown in FIG. 3.

Yet another significant feature of the exhaust treatment system 10 is the heat insulated catalyst assemblies 26, as best seen in FIGS. 3 and 5. As discussed above, the maximum allowable surface temperatures of mine certified diesel engines are limited to relatively low temperatures of about 300° F. Such low surface temperatures are usually achieved by surrounding the exhaust manifold with a water jacket. However, before a catalyst can be effective in oxidizing unburned hydrocarbons, carbon monoxide, and aerosols, it must be placed in the hot exhaust gases and allowed to reach the "trigger" temperature in the range of 400°–500° F., which triggers the oxidation process. The heat released by this oxidation further heats the catalyst, so that most catalysts actually reach rather high steady state operating temperatures in the range of 1000° F. to 1400° F. Obviously, adding a catalyst to engines which must meet low surface temperature limits introduces at least two significant difficulties. First is the problem of insulating the catalyst so that the surface temperature of the catalyst housing does not exceed 300° F. Second, the catalyst itself must be sufficiently insulated from the cooling jacket surrounding the catalyst housing, so that the catalyst material can reach its normal operating temperature. These problems proved to be formidable, and, consequently, catalyst systems have never enjoyed significant success on mine certified diesel engines.

As was briefly mentioned above, the improved exhaust treatment system 10 shown and described herein is intended for use in conjunction with a diesel engine 12 modified for use in underground mining environments; and environment in which the system can be used quite advantageously. As such, the engine system contains numerous additional safety components that are not part of the exhaust treatment system 10. More specifically, diesel engines used in such underground mining environments are generally subject to a wide variety of safety requirements established by the Mine Safety and Health Administration (MSHA), such as spark and fire suppression requirements as well as maximum allowable surface temperature limits and exhaust gas temperature limits, just to name a few. The engine system shown and described herein includes numerous additional components to meet these safety requirements, such as spark and flame arresters and emergency shut down systems, that would not necessarily be required or desired in other applications. However, such additional components are well known in the art, and the provision or omission of such components, or the addition of any other components or modifications required or desirable for a specific application would be obvious to persons having ordinary skill in the art. Also, this system 10, while intended for use on mine certified engines, can also be used on other engines in other applications. Therefore, the improved exhaust treatment system 10 according to this invention should not be regarded as limited to use with the mine certified diesel engine shown and described herein.

The details of the improved exhaust treatment system 10 are now best understood by referring to FIGS. 1, 2, and 3 simultaneously. In the preferred embodiment, the diesel engine 12 is an MWM D916-6 diesel engine, although any other diesel engine from any other manufacturer could be used just as easily. While the exhaust treatment system 10 according to this invention is very effective in removing most of the pollutants from the engine exhaust, it is preferred that the engine burn low-sulfur or no-sulfur fuel to reduce or eliminate sulfate emissions and to extend catalyst life. For example, in the preferred embodiment, the diesel engine 12 burns a no-sulfur synthetic diesel fuel manufactured by Fuelco.

The diesel engine 12 includes a conventional mine certified intake manifold 34 having a flame arrester assembly 36, an emergency intake air shut off valve 40, and air intake filter assembly 38. The flame arrester assembly 36 is required to meet current MSHA safety regulations and prevents flames from propagating back through the intake system in the event of engine backfire. The emergency intake air shut off valve 40 is positioned between the spark arrester assembly 36 and the air intake filter 38 and is controlled by emergency shut off system 42. If a dangerous operating condition is detected by any one of a number of sensors, the system 42 will close valve 40, thus stopping the engine 12. For example, in the preferred embodiment, the emergency shut off system 42 may shut down the engine if a high coolant temperature or low coolant level is detected, or if the temperature of the exhaust gases exceeds the maximum allowable safe temperature. The emergency shut off system 42 also includes a fuel shut off system (not shown) to further ensure rapid engine shut-down. Of course, the specific emergency shut off systems that would need to be provided on a particular engine would depend on the current MSHA regulations and on the particular application. However, because such emergency shut off systems are well-known in the industry, the appropriate systems can be easily provided by persons having ordinary skill in the art once they become familiar with the regulations, the particular application, and the details of this invention. Therefore, such emergency shut off systems will not be described in further detail.

Since the mine certified engine 12 shown in FIG. 1 is limited to maximum allowable surface temperatures of 300° F., the exhaust manifold 16 is water jacketed to prevent the surface temperature of the manifold from exceeding this maximum allowable limit. Similarly, the water cooled heat exchanger 14 is also designed to meet this maximum allowable surface temperature limit. In the preferred embodiment, heat exchanger 14 comprises a plurality of horizontal cooling tubes 30 arranged in parallel, spaced-apart relation inside an external housing 76 and above and below a central exhaust collector chamber 46, as best seen in FIGS. 2 and 3. Cooling water 50 from radiator 56 enters the external housing 76 through bottom inlet 52, and circulates around the lower cooling tubes 30, up around the upper cooling tubes 30, and out through outlet 54. The heated exhaust cooling water 50 is then pumped through radiator 56 where it is cooled and recirculated back through the heat exchanger 14.

Figure 4:
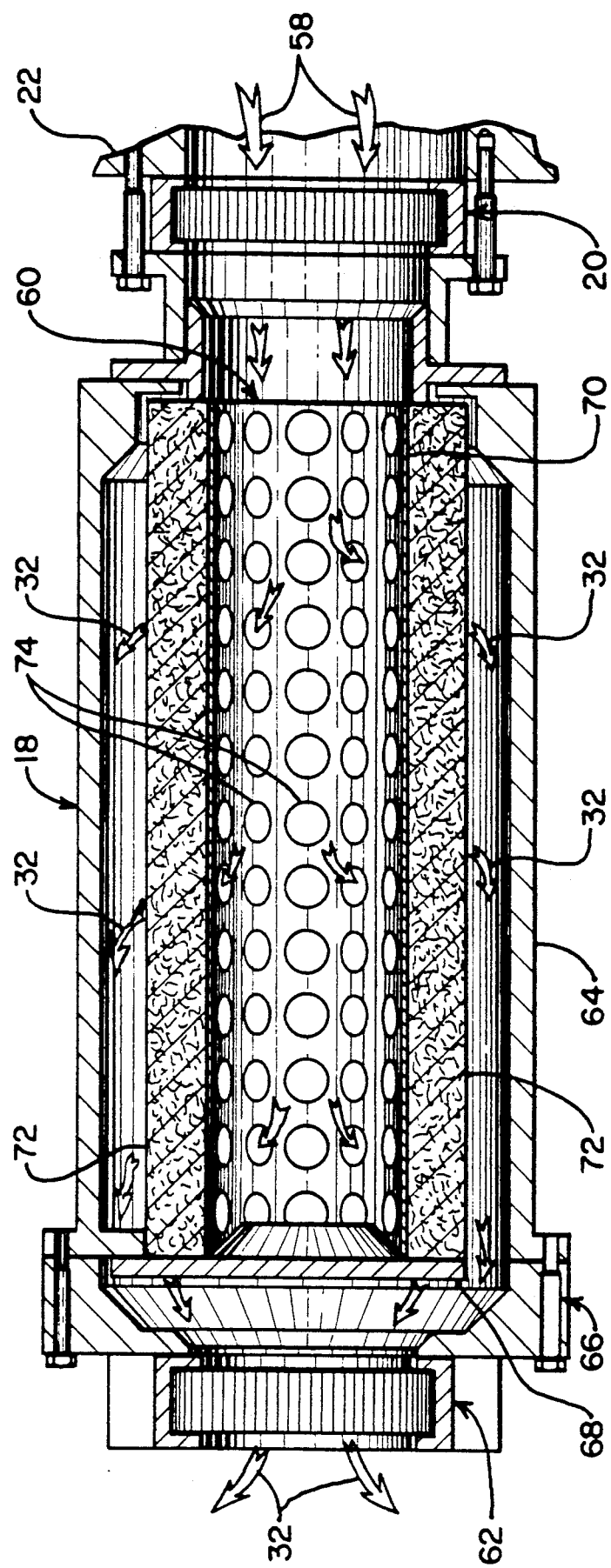
FIG. 4 is a sectional view in elevation of the filter and optional spark arrester assembly taken along the line 4—4 of FIG. 1, showing the position of the disposable, low temperature filter element and the flow of exhaust gases through the filter.

Referring now to FIG. 4, filter assembly 18 comprises a cylindrical housing 64 adapted for attachment at one end to flange 22 on heat exchanger 14, or as shown in FIG. 4, to the optional flame arrester assembly 20. An end cap assembly 66 is bolted to the opposite end of cylindrical housing 64 and includes an end plate 68 for sealing off the central cavity 70 of filter 60, so that the cooled exhaust gases 58 are directed through the filter material 72 via the plurality of apertures 74 in cavity 70, as will be described below. When the filter element 60 becomes clogged, end cap assembly 66 can be easily removed, the clogged filter element 60 removed and discarded, and a new filter element inserted into the housing 18. In the preferred embodiment, the filter element 60 is a disposable diesel exhaust filter of the type manufactured by the Donaldson Company, Inc., of Minneapolis, Minn.

The improved exhaust treatment system 10 also includes a plurality of catalyst assemblies 26 located in each runner 28 of exhaust manifold 16, as best seen in FIGS. 3 and 5. Each catalyst assembly 26 comprises a honeycomb arrangement of a suitable catalyst material 80, such as platinum, encased by a stainless steel cylindrical inner jacket 82. An outer jacket 83 surrounds the inner jacket 82 and secures the catalyst assembly 26 in the exhaust runner 28. A heat insulating ceramic fiber material 84, such as Nextel TM ceramic fiber available from 3M, disposed in the annulus between the inner jacket 82 and outer jacket 83, prevents excessive heat from the catalyst 80, which heats to between 1000° F. and 1400° F., from being transferred to the outer jacket 83 and manifold runner 28. The small annulus 86 between the outer jacket 83 and the inside surface of the exhaust manifold runner 28 further helps to prevent heat from being transferred from the catalyst material 80 into the cooling water jacketing the manifold runner 28. The combination of the annulus 86 and the heat insulator 84 sufficiently insulates the catalyst material 80 from the cool exhaust manifold 16, so that the catalyst material can heat to its operating temperature and burn unburned hydrocarbons, reduce aerosols, and oxidize carbon monoxide to carbon dioxide. Because the catalyst assemblies 26 lower the amount of solid particulate soot matter in the exhaust by burning some of the unburned hydrocarbons, the intervals between filter changes can be increased, or, alternatively, smaller filter elements can be used.

Figure 6:
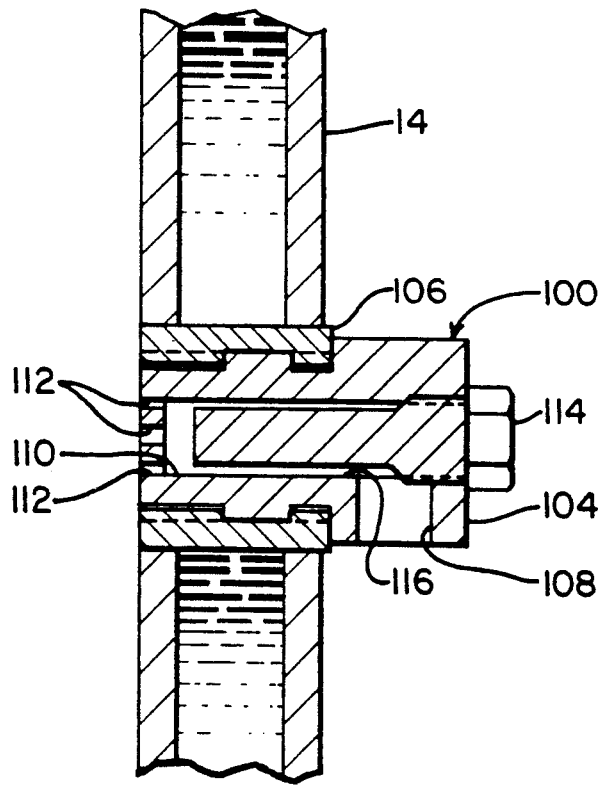
FIG. 6 is a sectional view in elevation of the flame-proof water injection nozzle according to the present invention.

The water injection system 24 is best seen in FIGS. 1 and 6 and comprises a reservoir and check valve assembly 96, a hand operated piston pump 98, and a flame proof injector nozzle 100. In the preferred embodiment, the reservoir and check valve assembly 96 and hand operated piston pump 98 are remotely located from the engine 12 to allow easy access by the operator. Reservoir 96 contains a supply of water and is connected to a small displacement piston pump 98 via an ordinary check valve (not shown), which prevents water from being pumped back into the reservoir. Piston pump 98 is actuated by handle 99 to pump about 1 oz. of water through hose 102 to the flame proof injector 100. Note that other devices could be used to inject the water. For example, the hand operated piston pump 98 could be automatically actuated by a pneumatic or hydraulic actuating system, which actuating system could be either manually or automatically triggered. Still other alternatives are possible and would be obvious to persons having ordinary skill in the art. Therefore, the present invention should not be regarded as limited to the hand operated water injection method shown and described herein.

The details of the flame proof injector 100 are best seen in FIG. 6. The injector 100 comprises a main body 104 that screws into a threaded insert 106 in heat exchanger 14. Main body 104 includes a water inlet 108 and a central cavity 110. A plurality of holes 112 drilled through main body 104 allow water in the central cavity 110 to be sprayed into the interior of the heat exchanger 14. A central plug 114 passes through the central cavity 110 and creates a small annulus 116 between the cavity 110 and the plug 114. This small annulus 116 is sufficiently long to suppress any flame that may propagate through the holes 112 before it reaches the inlet 108. In the preferred embodiment, the annulus gap is less than 0.018" and about 1" long. This annulus length and gap meets or exceeds the flame suppression requirements set by MSHA.

During engine operation, raw exhaust gases 47 from the combustion chambers enter each of the water jacketed runners 28 of manifold 16 and pass through catalyst assemblies 26, as best seen in FIG. 3. In accordance with well-known principles, the catalyst material 80, operating at very high temperatures, oxidizes some of the unburned hydrocarbons in the raw exhaust gases 47 and also oxidizes carbon monoxide, converting it into carbon dioxide. The catalyst 80 also reduces odors and aerosols in the exhaust gases as well.

The catalyzed exhaust gases 48 next enter the central collector chamber 46 of heat exchanger 14, as best seen in FIGS. 2 and 3. The catalyzed exhaust gases 48 travel down the central collector chamber 46 and enter the upper series of cooling tubes 30. The hot catalyzed exhaust gases are cooled as they travel through the upper series of water cooled tubes 30, into intermediate plenum chamber 49, and through the lower series of cooling tubes 30. The cooling water 50 circulating around the outside of tubes 30 absorbs the heat from the hot, catalyzed exhaust gases 48, so that the exhaust gases are cooled below 300° F. by the time the cooled exhaust gases 58 enter outlet plenum 23 of heat exchanger 14. Outlet plenum 23 also contains an exhaust back pressure sensor 90 and an exhaust gas temperature sensor 92. In the preferred embodiment, the exhaust back pressure sensor 90 is connected to a suitable gauge (not shown), so that the operator can monitor the exhaust back pressure. If the back pressure exceeds the maximum back pressure allowable for the particular engine, the operator can then manually shut down the engine and replace the filter element 60. The heat exchanger 14 also contains a cooling water temperature sensor 94 (FIG. 1) and the safety shut down system 42 will shut down the engine if the cooling water temperature exceeds 210° F. or if the exhaust gas temperature exceeds 300° F.

Referring now to FIG. 4, the cooled exhaust gases 58 next pass through optional flame arrester assembly 20, which extinguishes any flames which may be present in the exhaust, and into filter assembly 18. The cooled exhaust gases 58 are directed through the disposable low temperature filter element 60, which traps the solid particulate soot matter and any sparks that may also be entrained in the cooled exhaust gases 58. The filtered exhaust gas 32 exits filter assembly 18 via another flame arrester assembly 62, which serves as a safeguard against flames being discharged with the exhaust gases.

In the preferred embodiment it is desirable to use the water injection system 24 to clean out the cooling tubes in the heat exchanger 14 just before the filter element 60 is changed. Heat exchanger cleaning is best accomplished by speeding the engine up to maximum rated rpm to get a high exhaust gas flow rate through the heat exchanger 14. The operator can then operate piston pump handle 99 to forcibly inject about 1 oz. of water into the hot catalyzed exhaust gases 48 just upstream of the upper cooling tubes 30. See FIG. 2. The injected water instantly flashes to steam, which creates a pressure pulse that travels down the cooling tubes, forcibly dislodging and blowing out the soot that accumulated on the inside surfaces of the cooling tubes. The dislodged soot is then carried downstream to the filter assembly 18 which traps the dislodged soot. Because of the large amount of soot that is dislodged in this cleaning process, it is usually necessary to change the filter element 60 immediately. A new filter can then be installed and the engine operated normally. Just before the end of the next filter change interval, the water injection process is again performed to clean out the heat exchanger and the filter element replaced again. If the heat exchanger 14 is heavily sooted (due to engine malfunction), the injection process can be repeated until all the soot is blown out of the heat exchanger.

This completes the detailed description of the improved exhaust treatment system according to the present invention. While the treatment system 10 was described above as it could be used with a diesel engine for underground mining use, many other applications are possible. As described above, the exhaust treatment system 10 can be used in conjunction with diesel and other internal combustion engines in a wide variety of applications where it is desired to limit the particulate emissions of such engines. The water injection system provides an ideal means for maintaining the thermal efficiency of the heat exchanger by using steam pulses to remove the soot accumulations from the cooling tubes. The dislodged soot accumulations are automatically trapped by the filter, which can then be replaced with a new element and operations resumed.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

The embodiments of the invention in which an exclusive property or privilege is claimed are defined as follows:

1. In a diesel engine of the type used in underground mines having a water jacketed exhaust manifold and a water cooled heat exchanger with a plurality of water jacketed passages through which flow exhaust gases from the engine, the improvement comprising:
   intermittent water injection means connected to the exhaust manifold upstream of the water cooled heat exchanger for injecting a predetermined quantity of water into the exhaust gases at predetermined time intervals, whereby said predetermined quantity of water flashes to steam and creates a pressure pulse which pulse dislodges the solid particulate matter that has accumulated on the water jacketed passages in the water cooled heat exchanger.

2. The diesel engine of claim 1, wherein said intermittent water injection means comprises:
   a water reservoir for storing water to be injected;
   injector means connected to the exhaust manifold upstream of the heat exchanger and adapted to inject water into the exhaust gases; and
   pump means connected to said water reservoir and said injector means for pumping a predetermined quantity of water from said water reservoir to said injector.

3. Apparatus for reducing exhaust emissions from a diesel engine having an exhaust manifold through which pass exhaust gases from the engine, which exhaust gases contain solid particulate matter, comprising:
   a water cooled heat exchanger connected to the exhaust manifold having a plurality of water jacketed passages through which flow the exhaust gases from the engine, whereby said water cooled heat exchanger removes heat energy from the exhaust gases to cool the exhaust gases down to a predetermined temperature;
   disposable low temperature filter means connected to said water cooled heat exchanger and positioned to intercept the cooled exhaust gases and trap substantially all of the solid particulate matter entrained therein, thereby preventing the solid particulate matter from escaping with the filtered exhaust gases into the atmosphere; and
   intermittent water injection means connected to the exhaust manifold upstream of said water cooled heat exchanger for injecting a predetermined quantity of water into the exhaust gases at predetermined time intervals, whereby said predetermined quantity of water flashes to steam and creates a pressure pulse which pulse dislodges solid particulate matter that has accumulated on the water jacketed passages in said water cooled heat exchanger and carries the dislodged solid particulate matter downstream to said disposable low temperature filter means.

4. The exhaust emission reducing apparatus of claim 3, including heat isolated catalyst means disposed within the exhaust manifold for oxidizing some of the solid particulate matter entrained in the exhaust gases before the exhaust gases enter said heat exchanger means.

5. The exhaust emission reducing apparatus of claim 4, wherein said intermittent water injection means comprises:
   a water reservoir for storing water to be injected;
   injector means connected to the exhaust manifold upstream of the heat exchanger and adapted to inject water into the exhaust gases; and
   pump means connected to said water reservoir and said injector means for pumping a predetermined quantity of water from said water reservoir to said injector.

6. The exhaust emission reducing apparatus of claim 5, wherein said filter means comprises:
   a filter housing having an inlet and an outlet and wherein the inlet is connected to said heat exchanger;
   a disposable low temperature filter element disposed within said filter housing such that the products of combustion pass through the inlet in said filter housing, through said filter element, and out though the outlet in said filter housing.

7. The exhaust emission reducing apparatus of claim 6, wherein said diesel engine is supplied with low sulfur fuel.

8. An internal combustion engine assembly, comprising:
   an internal combustion engine including a combustion chamber, a fuel passageway for admitting a mixture of hydrocarbon fuel and oxygen into the combustion chamber, means for igniting the mixture, and an outlet from the combustion chamber for the products of combustion;
   a heat exchanger connected to the outlet from the combustion chamber having a plurality of passages through which pass the products of combustion and on which accumulate solid particulate soot matter from the products of combustion;
   intermittent water injection means connected between said heat exchanger and the outlet from the combustion chamber for injecting a predetermined quantity of water into the products of combustion at predetermined time intervals, whereby said predetermined quantity of water flashes to steam and creates a pressure pulse which pulse dislodges the solid particulate soot matter that has accumulated on the passages in said heat exchanger;

filter means connected to said heat exchanger for removing the solid particulate soot matter from the products of combustion; and catalyst oxidation means positioned between the outlet from the combustion chamber and said intermittent water injection means for oxidizing some of the solid particulate soot matter in the products of combustion.

9. The internal combustion engine assembly of claim 8, wherein said filter means comprises:

a filter housing having an inlet and an outlet and wherein the inlet is connected to said heat exchanger;

a disposable low temperature filter element disposed within said filter housing such that the products of combustion pass through the inlet in said filter housing, through said filter element, and out though the outlet in said filter housing.

* * * * *